United States Patent Office 3,383,355
Patented May 14, 1968

3,383,355
METHOD FOR PREPARING ORGANOSILOXANE POLYMERS
Kenneth G. Cooper, Glamorgan, Wales, assignor to Midland Silicones Limited, Reading, Berkshire, England
No Drawing. Filed Aug. 10, 1966, Ser. No. 571,387
Claims priority, application Great Britain, Aug. 11, 1965, 34,375/65
10 Claims. (Cl. 260—46.5)

ABSTRACT OF THE DISCLOSURE

The invention relates to a novel method for preparing siloxane polymers having alkoxy groups bonded to terminal silicon atoms by reacting a hydroxylated organosiloxane polymer with an alkoxy silane in the presence of a suitable catalyst.

---

This invention introduces a novel method for reacting organopolysiloxanes containing hydroxyl radicals bonded to silicon with silanes having alkoxy radicals bonded to silicon. This invention is particularly suited for preparing siloxane polymers having alkoxy groups bonded to terminal or chain-ending silicon atoms.

Organopolysiloxanes containing silicon-bonded alkoxy radicals find use as intermediates in the preparation of other organosilicon materials and also in the preparation of high-temperature resistant resinous and elastomeric compositions. Of particular interest are diorganopolysiloxanes containing one or more alkoxy radicals attached to each terminal silicon atom because such polymers are useful in the preparation of silicone rubber stocks which have the property of vulcanization at normal room temperatures. When there is present only one alkoxy radical on each terminal silicon atom of the siloxane polymer molecule the polymers are normally convertible to the elastic state at low temperatures only by the addition of a cross-linking agent and a siloxane condensation catalyst. However it has recently been found that when each of the terminal silicon atoms have an average of more than one alkoxy radical bonded thereto, the siloxane polymer is capable of vulcanization without the presence of a cross-linking agent.

Diorganopolysiloxanes containing terminal silicon-bonded alkoxy radicals, and particularly those containing an average of more than one alkoxy radical per terminal silicon atom are therefore of commercial importance. Difficulties exist however, in the preparation of polymers of this type. One method which has been proposed for their preparation comprises reacting under anhydrous conditions a hydroxylated siloxane with an alkoxy substituted chlorosilane in the presence of a hydrogen halide acceptor such as pyridine or α-picoline. Under these conditions reaction is said to occur at room temperature between the chlorine on the silane and the hydroxyl groups on the siloxane to produce hydrogen chloride and to cause the linking of the silane with the siloxane through an Si—O—Si linkage. Such a method is not, however, very satisfactory because considerable difficulty is experienced in removing the pyridine hydrochloride from the reaction product.

A further method which has been proposed comprises reacting under anhydrous conditions a hydroxylated siloxane and an alkoxy silane in the presence of a catalyst for the reaction of ≡SiOH with a silicon-bonded alkoxy radical. Suitable catalysts which have been proposed for this reaction are amines and carboxylic acid salts of metals such as lead, tin and iron. Although this method provides a means of producing the desired polymers the reaction times are prolonged and it has additionally been found difficult to remove completely the catalyst residue from the product. This latter disadvantage is of special significance in view of the tendency of the polymer to gel in the presence of both moisture and catalysts of this type.

It is the object of this invention to introduce a novel method for preparing the desired polyalkoxysilicon endblocked diorganopolysiloxanes. A further object is a method for reacting alkoxy silanes with hydroxylated organopolysiloxanes to produce alkoxylated organopolysiloxanes. A further object is to produce a polyfunctional organosiloxane polymer particularly useful in a room-temperature vulcanizing silicone rubber stock. The solution of the problems outlined above as part of the prior art as well as other objects and advantages obvious to one skilled in the art are accomplished by this invention.

We have now unexpectedly found that neutral, finely-divided solid materials having a high surface energy, such as inorganic oxides, metal silicates, metal sulfates, metal phosphates and metals are useful catalysts in the reaction of ≡SiOH with silicon-bonded alkoxy radicals. We have found that such catalysts are particularly useful in the preparation of alkoxy terminated diorganopolysiloxanes from diorganopolysiloxanes containing silicon-bonded hydroxyl radicals and silanes containing at least one silicon-bonded alkoxy radical. We have also found that certain advantages arise from the use of the neutral catalysts according to this invention.

U.S. Patent No. 3,169,942 descibes the use of crystalline zeolitic molecular sieves as catalysts for preparing siloxane polymers, and states that such materials catalyze the condensation of hydroxy silanes with alkoxysilanes to form siloxane polymers.

The zeolites are a group of rare minerals characterized by their crystal structure which possesses a series of interconnecting pores of fixed size. Zeolitic molecular sieves are distinguished from other crystalline materials by their ability to absorb molecules selectively up to a given size, the absorbed molecules being situated in cells within the crystal lattice. Molecular sieve action differs from the formation of clathrate compound such as palladium hydride in that the crystal structure remains substantially unaltered. Natural zeolites are not readily available and synthetic zeolites are expensive, and inconvenient for use as industrial catalysts.

The catalysts of the present invention differ from zeolite molecular sieves in that they possess no, or relatively little, tendency to absorb molecules into the crystal lattice. We believe therefore that their surprising catalytic action must be due to adsorption of the reagents onto the surface of the particles. The catalysts of the present invention include some of the cheapest and most readily available inorganic materials.

This invention therefore provides a process which comprises reacting a hydroxylated organosiloxane with a silicon compound containing at least one silicon-bonded alkoxy radical, said reaction being carried out in the presence of a substantially neutral, finely-divided solid which is insoluble in the reaction medium, has a sufficiently high surface energy to adsorb the reagents and exerts no significant molecular sieve action.

The invention further provides organosilicon polymers and mixtures thereof when prepared according to said process.

The hydroxylated organopolysiloxanes which are employed in the process of the present invention are those having from 1 to 2 organic radicals per silicon atom and containing on average at least one silicon-bonded hydroxyl group per molecule. Preferred as the hydroxylated organopolysiloxanes are those having a substantially linear configuration and containing an average of one hydroxyl radical attached to each terminal silicon atom. The preferred organopolysiloxanes can be represented by the general formula $$(HO)_c[R_aSiO_{\frac{4-a}{2}}]_bH$$

wherein $a$ has a value from 1.90 to 2 and preferably from 1.99 to 2, $b$ is an integer greater than 1 and $c$ has a value from 1 to 1.05. The organic substituents R can be any monovalent hydrocarbon radical such as alkyl radicals, for example methyl, ethyl, propyl, hexyl and octadecyl, alkenyl radicals such as vinyl, allyl and hexenyl; cycloaliphatic radicals such as cyclohexyl, cyclopentyl and cyclohexenyl and aromatic hydrocarbon radicals such as phenyl, xenyl and naphthyl. In addition R can be a monovalent halogenated hydrocarbon radical such as gamma-chloropropyl, 3,3,3-trifluoropropyl and chloroxenyl. Further examples of the monovalent radicals bonded to silicon in the polymers and represented by R can be seen in representative U.S. patents such as No. 2,843,555 and No. 3,127,363. It will be understood that R can represent the same or different organic substituents in any one molecule. Thus the organopolysiloxanes can be homopolymers or copolymers and can comprise mixtures of the two. In view of their ready availability and general commercial utility the most preferred organopolysiloxanes for employment in the process of this invention are the hydroxylated dimethylpolysiloxanes or hydroxylated copolymers containing a major proportion of dimethylsiloxane units with a minor proportion of one or more of methylphenylsiloxane units, methylvinylsiloxane units, diphenylsiloxane units and methyltrifluoropropylsiloxane units. Hydroxylated methylpolysiloxanes of this type and methods of preparing them are now well known in the art. The hydroxylated siloxanes employed according to the invention may range from freely flowing liquids to highly viscous materials. When the reaction product is destined for use in a low temperature or room temperature vulcanizing silicone rubber stock, it is preferred however, that the viscosity of the hydroxylated siloxane should be low enough, for example from 1000 to 30,000 cs. at 25° C., to give rise to a reaction product having the desired degree of flow for such compositions.

Any silicon compound containing at least one silicon-bonded alkoxy radical can be reacted with the hydroxylated siloxane according to the process of this invention. In most cases it is desirable to remove excess of the alkoxy silicon compound from the reaction product and this is more easily achieved when the alkoxy silicon compound is of low molecular weight and is, for example, a silane or a short chain polysiloxane. Preferably, the alkoxy silicon compounds employed in the reaction of this invention are the alkoxy silanes of the general formula, $$R''_nSi(OR')_{4-n}$$

wherein $n$ is 0, 1, 2 or 3, R'' is a monovalent hydrocarbon radical, as illustrated above, and R' is an alkyl radical containing less than 4 carbon atoms. Alkoxy silanes in which R'' is a lower alkyl radical, for example the methyl radical, $n$ is 0 or 1 and R' is the methyl or ethyl radical, are preferred because of their superior reactivity. Examples of the preferred silanes include methyltrimethoxysilane, propyltrimethoxysilane, tetraethoxysilane and tetramethoxysilane.

When preparing alkoxy-terminated linear siloxane polymers of substantially the same chain length as the hydroxylated starting material the desired reaction involves the condensation of any given molecule of the alkoxy silicon compound with only one terminal silicon-bonded hydroxyl radical in the diorganopolysiloxane. The use of stoichiometric quantities of the reactants or of only a small excess of the alkoxy silicon compound can lead to chain extension when the alkoxy compound contains two alkoxy radicals per molecule, or to cross-linking and therefore gelation of the reaction product when the alkoxy silicon compound contains an average of more than two alkoxy radicals per molecule. The preparation of the linear alkoxy terminated siloxane polymers according to the invention is best achieved employing a large excess of the alkoxy silicon compound, i.e., up to a twentyfold excess or more.

The reaction between the hydroxylated siloxane and the silicon compound takes place in the presence of a catalyst which is a substantially neutral, finely divided solid of sufficiently high surface energy to absorb the reagents. This catalyst is insoluble in the reaction medium and does not exert any significant molecular sieve action. Examples of operative catalysts are an inorganic oxide, neutral inorganic salts such as metal silicate, metal sulfates, metal phosphates and metal chlorides as well as powdered metal. The catalyst is substantially neutral, that is, it does not contain any significant proportions of free and/or exchangeable acidic or basic materials or groups, as the presence of basic or acidic substances in the reaction mixture can lead to undesirable side reactions. The catalyst is also thermally stable at the reaction temperature and unreactive with the reaction components. Suitable catalysts for use in the process of this invention include inorganic oxides such as aluminum oxide and silica, finely-divided metal silicates and natural and synthetic clays such as fuller's earth, calcium silicate, vermiculite and kaolin, metals such as finely-divided iron and metal salts such as barium sulfate and sodium chloride.

The quantity of catalysts employed can vary within a wide range. It has been found, however, at least in some cases, that the particle size of the catalyst can influence the quantity of catalyst required insofar as it may be necessary, for any given catalyst material, to employ a greater quantity of the catalyst material with increasing particle size. Although catalysts having a particle size of approximately 30μ and even smaller can be employed, catalyst materials of larger particle size, for example from 100–200 mesh, are preferred from a practical standpoint in view of the increased facility with which the coarser material can be removed from the reaction product on completion of the reaction.

As hereinbefore noted the quantity of catalyst required can depend to some extent on the particle size of the material. Quantities as small as 0.05% by weight and lower, based on the total weight of the organosilicon reactants are operative but it has been found desirable to remove moisture from the catalyst and other reaction components as far as possible when the catalyst is employed in quantities of this order. As much as 5% by weight or more of the catalyst can be employed if desired, but no advantage is thought to accrue from the use of such quantities. In general, catalyst amounts should be 0.03 to 1% by weight based on the weight of the organosilicon reactants.

Reaction between the hydroxylated polysiloxane and the alkoxy silicon compound can be brought about by mixing these two components in the presence of the catalyst at a suitable temperature. Although some reaction may occur at lower temperatures it is preferred to heat the reaction mixture to a temperature in the range from 120° to 160° C. The reaction time will vary depending on the nature of the catalyst, the reactants and the temperature employed, but we have found that reaction times as low as from 1 to 3 hours can be achieved employing a fuller's earth of particle size about 30μ. If desired, the reaction can be carried out in the presence of a solvent, which is desirably non-polar, for the reactants, suitable solvents including for example benzene, xylene and toluene.

The reactants can be mixed in any order and one convenient method of performing the reaction comprises adding the alkoxy silicon compound to a mixture of the hydroxylated polysiloxane and the catalyst. The reaction mixture is then stirred and heated to a temperature of about 150° C. If desired the reaction can be performed under a blanket of dry inert gas and this technique is preferred when the reactants have been previously dried and the reaction is carried out under substantially anhydrous conditions. After the termination of the reaction the reaction product can be recovered, any excess of the alkoxy silane or solvent being removed by stripping under reduced pressure.

As hereinbefore stated the use of the particular catalyst materials according to this invention possesses certain advantages over the use of the prior art catalysts. For example the rate of reaction between the hydroxylated siloxane and the alkoxy silane is often significantly increased over that obtainable when, for example, hexylamine is employed as the catalyst for the reaction. In addition it is not essential for many applications to remove the catalyst completely, although such removal is readily achieved by filtration. A further advantage lies in the comparative lack of toxic hazard and the improved handling properties of the catalysts of this invention when compared with prior art catalysts such as hexylamine and pyridine.

The process of this invention represents a simple and effective method of reacting siloxane polymers containing silicon-bonded hydroxyl radicals with alkoxy silicon compounds. It is particularly suitable for the preparation of functional diorganopolysiloxanes having from two to three alkoxy radicals attached to each terminal silicon atom. Diorganopolysiloxanes of this type are curable in the presence of moisture and a suitable hydrolysis and condensation catalyst to rubbery materials, and are therefore useful for example in preparing coating compositions for paper, metals and other substrates. They can also be combined with fillers such as titania, calcium carbonate or zirconia and other additives to form one component or two component vulcanizable silicone rubber stocks useful as potting, sealing, moulding and encapsulating materials or in any of the other many fields in which room temperature curing silicone rubbers have found application.

The following examples illustrate the invention, the scope of which is delineated in the claims and is not limited by the examples. All parts and percentages are based on weight and all viscosities measured at 25° C.

EXAMPLE 1

A 500 g. sample of a dimethylsiloxane polymer having terminal silicon-bonded hydroxyl radicals and a viscosity of 8000 cs. after stripping by heating under reduced pressure to remove volatiles was charged to a reaction vessel fitted with a stirrer and condenser. Next, 25 g. of methyl trimethoxysilane and 0.25 g. of a neutral fuller's earth having an average particle size of approximately 30 to 40 microns and which had been dried by heating in a nitrogen atmosphere at 250° C. were added to the reaction vessel.

A blanket of nitrogen was introduced into the reaction vessel and maintained over the reactants and the temperature of the reactants raised to 150° C. with constant stirring. After 3 hours at this temperature the vessel was allowed to cool and the contents were stripped of volatile material by passage through a thin film stripping apparatus at 200° C. under reduced pressure of 1 mm. Hg. The product obtained after filtration of the stripped material was a colorless polymer having a viscosity substantially the same as that of the original hydroxylated dimethylsiloxane polymer and which was found to contain no detectable silicon-bonded hydroxyl radicals.

The polymer obtained was mixed with 0.5% by weight of tetrabutyl titanate and exposed to the atmosphere. The polymer skinned over in 5–10 minutes and had set to a firm rubber after 3 days.

Similar results were obtained when the process was repeated employing as the catalyst 0.25 g. of a finely-divided silica having a particle size of approximately 30 microns.

EXAMPLE 2

The procedure of Example 1 was repeated employing as the catalyst 2 g. of 100–200 mesh chromatographic grade aluminum oxide in place of the fuller's earth.

The reaction product was a polymer which cured to a rubber when catalyzed with 0.5% by weight of tetrabutyl titanate and exposed to the atmosphere.

EXAMPLE 3

500 g. of an unstripped dimethyl siloxane polymer having terminal silicon-bonded hydroxyl radicals and a viscosity of 5,100 cs. was reacted with 25 g. of methyl trimethoxysilane according to the process described in Example 1. The catalyst employed on this occasion comprised 3 g. of a fuller's earth having particle size of 100–200 mesh After stripping, the reaction product was a polymer containing no detectable ≡SiOH and having a viscosity of 10,800 cs. at 25° C.

EXAMPLE 4

The procedure of Example 1 was repeated employing tetramethoxysilane in place of the methyl trimethoxysilane with 2 g. of a fuller's earth having a wide distribution of particle sizes as the catalyst. The reaction product obtained was a colorless polymer containing no detectable ≡SiOH. The reaction product cured to a firm rubber when catalyzed with 0.5% by weight of tetrabutyl titanate and exposed to the atmosphere for several days.

EXAMPLE 5

When Example 1 was repeated employing 15 g. of methyl trimethoxysilane and 2 g. of the fuller's earth catalyst similar results were obtained.

EXAMPLE 6

500 g. of the unstripped dimethyl siloxane polymer employed in Example 3 was reacted with 25 g. of $$CH_3Si(OCH_3)_3$$

by heating in the presence of 3 g. of 100–200 mesh screened iron powder. After stripping to remove volatiles and excess $CH_3Si(OCH_3)_3$ and filtration, the reaction product was found to comprise a colorless polymer containing no detectable ≡SiOH. This polymer was found to cure to a rubbery material on the addition of a siloxane curing catalyst and exposure of the catalyzed mixture to the atmosphere.

That which is claimed is:
1. The process consisting essentially of reacting in the substantial absence of moisture
   (1) a hydroxylated organosilicon polymer of the general formula $$(HO)_c[R_aSiO_{\frac{4-a}{2}}]_bH$$

where each R is selected from the group consisting of monovalent hydrocarbon radicals and monovalent halogenohydrocarbon radicals, $a$ has an average value of 1.99 to 2.0, $b$ is an integer greater than 1 and $c$ has a value of about 1, with
   (2) an alkoxy silane of the general formula $$R''_nSi(OR')_{4-n}$$

where $n$ is 0, 1, 2 or 3, $R''$ is a monovalent hydrocarbon radical and $R'$ is an alkyl radical containing less than 4 carbon atoms, by heating (1) and (2) to a temperature of at least 120° C. in the presence of
   (3) a catalyst which is a substantially neutral finely divided solid which is insoluble in the reaction medium and has a sufficiently high surface energy to adsorb the reagents, but exerts no significant molecular sieve action and is selected from the group consisting of metal oxides, silica, powdered metals, metal phosphates, metal sulfates, metal chlorides, metal silicates, natural clays, and synthetic clays.

2. Process according to claim 1 wherein the catalyst has a particle size of 100 to 200 mesh.

3. Process according to claim 1 wherein the catalyst is present in a proportion of from 0.03% to 1.0% by weight.

4. Process according to claim 1 wherein the hydroxylated organosiloxane has the formula $$(HO)_c[R_aSiO_{\frac{4-a}{2}}]_bH$$

wherein $a$ has a value of from 1.90 to 2, $b$ is an integer greater than 1, $c$ has an average value from 1 to 1.05, and R is a monovalent hydrocarbon or halogenated hydrocarbon radical.

5. Process according to claim 4 wherein $a$ has a value of from 1.99 to 2.0.

6. Process according to claim 4 wherein the hydroxylated polysiloxane contains at least a major proportion of dimethyl siloxane units, any other siloxane units present being selected from methylphenyl siloxane, methyl vinyl siloxane, methyl trifluoropropyl siloxane and diphenyl siloxane units.

7. Process according to claim 6 wherein the hydroxylated siloxane has a viscosity of from 1000 to 30,000 cs. at 25° C.

8. Process according to claim 1 wherein R" is a lower alkyl radical, $n$ is 0 or 1 and R' is a methyl or ethyl radical.

9. Process according to claim 1 wherein the alkoxy silane is employed in a proportion in excess of two moles per equivalent of silicon-bonded hydroxyl group.

10. The process of claim 1 wherein the catalyst is selected from the group aluminum oxide, powdered iron, silica, fuller's earth, calcium silicate, vermiculite, kaolin, sodium chloride and barium sulfate.

References Cited

UNITED STATES PATENTS

| | | | |
|---|---|---|---|
| 3,065,194 | 11/1962 | Nitzsche et al. | 260—46.5 |
| 3,082,527 | 3/1963 | Nitzsche et al. | 260—37 |
| 3,127,363 | 3/1964 | Nitzsche et al. | 260—46.5 |
| 3,142,655 | 7/1964 | Bobear | 260—46.5 |
| 3,151,099 | 9/1964 | Ceyzeriat et al. | 260—37 |
| 3,154,515 | 10/1964 | Berridge | 260—37 |
| 3,161,614 | 12/1964 | Brown et al. | 260—46.5 |
| 3,169,942 | 2/1965 | Pike | 260—46.5 |
| 3,255,152 | 6/1966 | Kniege | 260—37 |

DONALD E. CZAJA, *Primary Examiner.*

M. I. MARQUIS, *Assistant Examiner.*